United States Patent [19]

Arai et al.

[11] Patent Number: 4,652,483

[45] Date of Patent: Mar. 24, 1987

[54] MAGNETIC RECORDING MEDIUM

[75] Inventors: Yoshihiro Arai; Akira Nahara; Kiyotaka Fukino, all of Odawara, Japan

[73] Assignee: Fuji Photo Film Co., Ltd., Kanagawa, Japan

[21] Appl. No.: 589,554

[22] Filed: Mar. 14, 1984

[30] Foreign Application Priority Data

Mar. 18, 1983 [JP] Japan ................................. 58-45718

[51] Int. Cl.$^4$ .............................................. G11B 5/72
[52] U.S. Cl. ..................................... 428/216; 427/39; 427/41; 427/131; 427/132; 428/215; 428/336; 428/694; 428/695; 428/900
[58] Field of Search ................... 427/44, 41, 39, 128, 427/131, 132; 428/694, 695, 900, 215, 216, 336; 360/134–136

[56] References Cited

U.S. PATENT DOCUMENTS

| | | | |
|---|---|---|---|
| 4,239,835 | 12/1980 | Iijima | 428/457 |
| 4,405,677 | 9/1983 | Chen | 428/900 |
| 4,414,271 | 11/1983 | Kitamoto | 428/336 |
| 4,419,404 | 12/1983 | Arai | 428/695 |
| 4,495,242 | 1/1985 | Arai | 428/336 |
| 4,521,482 | 6/1985 | Arai | 428/695 |
| 4,565,734 | 1/1986 | Arai | 428/694 |
| 4,582,746 | 4/1986 | Shirahata | 428/695 |
| 4,588,656 | 5/1986 | Kitamoto | 428/694 |

Primary Examiner—Ellis P. Robinson
Attorney, Agent, or Firm—Gerald J. Ferguson, Jr.; Michael P. Hoffman; Ronni S. Malamud

[57] ABSTRACT

A magnetic recording medium comprises a non-magnetic substrate, a thin ferromagnetic film layer overlaid on the substrate, and a polymer film formed by plasma polymerization. The thin ferromagnetic film layer is composed of ferromagnetic columnar grains. The polymer film is overlaid on the thin ferromagnetic film layer so as to permeate into the spaces between the ferromagnetic columnar grains, thereby improving the corrosion resistance and durability of the magnetic recording medium.

6 Claims, 7 Drawing Figures

MAGNETIC RECORDING MEDIUM

BACKGROUND OF THE INVENTION

1. Field of the Invention

This invention relates to a magnetic recording medium for use in a magnetic recording apparatus using a magnetic tape, or the like. This invention particularly relates to a thin metal film type magnetic recording medium exhibiting markedly improved corrosion resistance and durability.

2. Description of the Prior Art

Many of the conventional magnetic recording media are of the so-called coating type and made by using powdered magnetic materials such as magnetic oxide particles, for example, $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$, Co-doped Berthollide compounds, or $CrO_2$, or magnetic alloy particles containing, as main constituents, Fe, Ni, Co and the like. These powdered magnetic materials are dispersed in organic binders such as vinyl chloride-vinyl acetate copolymers, styrene-butadiene copolymers, epoxy resins and polyurethane resins. The dispersions thus obtained are then applied to non-magnetic substrates and dried to form the magnetic recording media.

Recently, so-called thin metal film type magnetic recording media using no binders have attracted attention because of their ability to meet strong demand for high density recording. The magnetic recording media of this type have magnetic recording layers which consist of thin ferromagnetic metal films formed by a process such as vacuum deposition, sputtering, ion plating or plating. Thus various efforts are being made to develop thin metal film type magnetic recording media suitable for practical use.

FIGS. 1 and 2 are explanatory views schematically showing the configurations of conventional magnetic recording media. As shown in FIG. 1, the conventional magnetic recording medium comprises a non-magnetic substrate 2 and a thin ferromagnetic metal film layer 1 overlaid on the substrate 2. However, since the thin ferromagnetic metal film layer 1 normally consists of an aggregate of columnar grains 3, corrosion readily arises through the spaces between the columnar grains 3. Also, as shown in FIG. 2, it has been proposed to overlay an overcoat film 4 made of a polymer film on the thin ferromagnetic metal film layer 1. However, since the overcoat film 4 of the thin metal film type magnetic recording medium is composed of relatively large polymer molecules, the overcoat film 4 does not enter the spaces between the columnar grains 3, but instead is simply overlaid on the columnar grains 3 in a plane form. Thus the overcoat film 4 is not so strong, and pin holes are readily generated in the portions of the overcoat film 4 between the columnar grains 3. When pin holes are generated in the overcoat film 4, corrosion of the columnar grains 3 readily proceeds through the pin holes.

Further, the conventional magnetic recording medium entails an even more troublesome problem in that, when the magnetic recording medium is used as a magnetic tape and moved in a magnetic recording and reproducing apparatus, the thin ferromagnetic metal film layer of the magnetic recording medium readily wears due to contact with the magnetic head or the guide post of the apparatus.

The aforesaid drawbacks of the conventional magnetic recording medium present a very real problem with regard to reliability required for the magnetic recording medium. However, there has not heretofore been any magnetic recording medium that eliminates the aforesaid drawbacks.

SUMMARY OF THE INVENTION

The primary object of the present invention is to provide a thin metal film type magnetic recording medium exhibiting markedly improved corrosion resistance.

Another object of the present invention is to provide a thin metal film type magnetic recording medium exhibiting markedly improved durability and high resistance to wear.

The thin metal film type magnetic recording medium in accordance with the present invention comprises a nonmagnetic substrate, a thin ferromagnetic film layer composed of ferromagnetic columnar grains, and a polymer film formed by plasma polymerization, said polymer film being overlaid on said thin ferromagnetic film layer so as to permeate into the spaces between said ferromagnetic columnar grains.

The magnetic recording medium of the present invention exhibits markedly improved corrosion resistance and durability.

The present invention will hereinbelow be described in further detail with reference to the accompanying drawings.

DETAILED DESCRIPTION OF THE INVENTION

Figure 1:
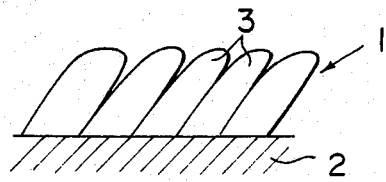
FIGS. 1 and 2 are explanatory views schematically showing the configurations of conventional magnetic recording media.
Figure 2:
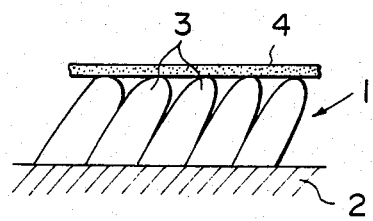
Figure 3:
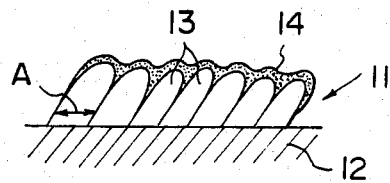
FIG. 3 is an explanatory view schematically showing the configuration of an embodiment of the magnetic recording medium in accordance with the present invention.

Referring to FIG. 3, the magnetic recording medium in accordance with the present invention comprises a non-magnetic substrate 12, a thin ferromagnetic metal film layer 11, and a polymer film 14 formed by plasma polymerization. The non-magnetic substrate 12 should preferably be a plastic film made of polyethylene terephthalate, polyimide, polyamide, polyvinyl chloride, cellulose triacetate, polycarbonate, polyethylene naphthalate or the like. It is also possible to use a non-magnetic substrate made of a non-magnetic metal such as Al, Cu or SUS (stainless steel), or a mineral material such as glass or a ceramic material. Also, a layer comprising an organic binder and inorganic particles dispersed therein may be laid on the surface of the substrate 12 opposite to the thin ferromagnetic metal film layer 11. The non-magnetic substrate 12 should more preferably be a flexible plastic film exhibiting surface roughness (ra) of 0.012 μm or less.

The thin ferromagnetic metal film layer 11 is composed of ferromagnetic columnar grains 13 of Co, a Co alloy material such as Co-Ni, Co-Cr or Co-Ni-Cr, or a Co alloy material containing oxygen, or the like. The thin ferromagnetic metal film layer 11 consisting of Co or an alloy containing Co is overlaid on the substrate 12, for example, by an oblique incidence vacuum deposition process.

By way of example, when the thickness of the thin ferromagnetic metal film layer 11 is 1,500 Å, the thin ferromagnetic metal film layer 11 composed of the columnar grain structure wherein the dimension A as shown in FIG. 3 is within the range of 100 Å to 900 Å is overlaid on the substrate 12, and then the polymer film 14 having a thickness within the range of 20 Å to 800 Å is overlaid by plasma polymerization on the thin ferromagnetic metal film layer 11. The polymer film 14 formed by plasma polymerization is obtained by plasma-polymerizing of an organic material, for example, by directly ionizing an organic monomer gas near the surface of the thin ferromagnetic metal film layer 11, or by introducing an organic monomer gas while electric discharge is conducted in an Ar gas atmosphere in the vicinity of the surface of the thin ferromagnetic metal film layer 11. In general, since the polymer film 14 formed by plasma polymerization is permeated into the spaces between the ferromagnetic columnar grains 13 and is crosslinked to a higher extent, the polymer film 14 formed by plasma polymerization exhibits a higher density and a higher strength than a polymer film obtained by the other polymerization reactions. Permeation of the polymer film 14 formed by plasma polymerization into the spaces between the ferromagnetic columnar grains 13 can be verified easily by investigating the distribution of the carbon contents in the thickness direction of the magnetic recording medium by Auger electron spectroscopy.

In the magnetic recording medium of the present invention, since the polymer film 14 formed by plasma polymerization is permeated into the spaces between the columnar grains 13, the thin ferromagnetic metal film layer 11 is efficiently prevented from being corroded through gas remaining in the spaces between the columnar grains 13. This is presumably because the polymer film 14 formed by plasma polymerization has the ability of preventing hydroxyl group (OH⁻) from entering the thin ferromagnetic metal film layer.

Further, since the polymer film 14 formed by plasma polymerization is permeated deeply into the spaces between the columnar grains 13, the columnar grains 13 do not readily break. Therefore, the magnetic recording medium in accordance with the present invention exhibits high durability.

The present invention will further be illustrated by the following nonlimitative examples.

In examples, a gas-introducing rate (cm³/min) is measured under 1 atom at 20° C.

EXAMPLE 1

Figure 4:
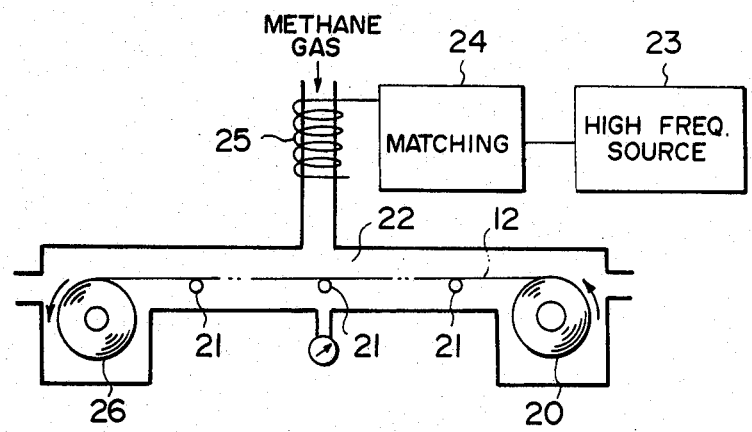
FIG. 4 is a schematic view showing an embodiment of the apparatus for making the magnetic recording medium in accordance with the present invention.

A thin ferromagnetic metal film layer having a thickness of 1,400 Å was overlaid on a 23μ-thick polyethylene terephthalate film (used as the non-magnetic substrate) by oblique incidence vacuum deposition of an alloy having a composition of $Co_{0.8}Ni_{0.2}$ at an angle of incidence of 50°. Then, by using an apparatus as shown in FIG. 4, a polymer film having a thickness of 100 Å was overlaid by plasma polymerization on the thin ferromagnetic metal film layer. Formation of the polymer film was conducted by conveying the substrate 12 along rollers 21 from a substrate feed chamber 20, and generating plasma of methane monomer ionized at a discharge section 22. In order to permeate the polymer film formed by plasma polymerization into the spaces between the columnar grains of the thin ferromagnetic metal film layer, the flow rate of methane gas was adjusted to 30 cm³/minute, and the discharge pressure was adjusted to 0.5 Torr. Generation of the plasma was conducted by generating a high frequency power at 13.56 MHz by a high frequency power source 23, matching the high frequency power in a matching box 24, and then applying the matched high frequency power to a coil 25. The high frequency power applied was 150W. The substrate 12 thus covered by the polymer film formed by plasma polymerization was wound up around a wind-up core 26.

Figure 5A:
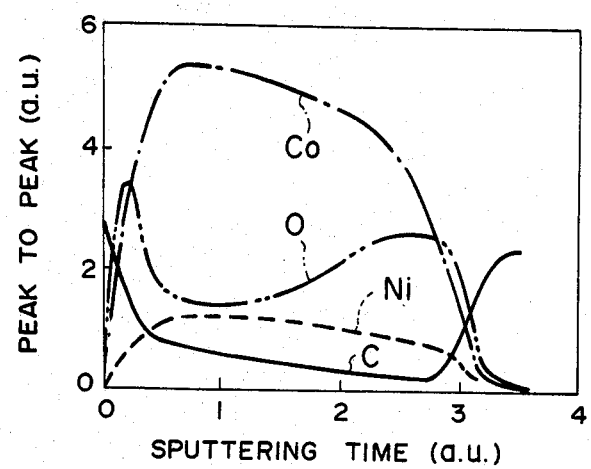
FIG. 5A is a graph showing the distribution of the contents of constituent elements in the thickness direction of the magnetic recording medium in accordance with the present invention, as analyzed by Auger electron spectroscopy.

FIG. 5A shows the distribution of carbon contents in the thickness direction of the magnetic recording medium prepared as described above, as analyzed by Auger electron spectroscopy. As is clear from FIG. 5A, the polymer film formed by plasma polymerization was permeated deeply into the spaces between the columnar grains of the thin ferromagnetic metal film layer.

Corrosion resistance of the magnetic recording medium prepared as described above was evaluated by maintaining the magnetic recording medium for two weeks in a thermo-apparatus at a temperature of 60° C. and relative humidity of 90%, and then examining the degree of corrosion arising in the magnetic recording medium. In this evaluation, the magnetic recording medium prepared as described above exhibited no corrosion. On the other hand, when a magnetic recording medium consisting of a substrate and a thin ferromagnetic metal film layer overlaid on the substrate was evaluated in the same manner, corrosion arose over the entire surface of the magnetic recording medium.

Also, in an actual operation test conducted in a VHS system video tape recorder, scratches arising in the magnetic recording medium prepared as described above were far fewer than in the conventional magnetic recording medium.

EXAMPLE 2

A thin ferromagnetic metal film layer was overlaid on a substrate in the same manner as described in Example 1, and a polymer film was overlaid by plasma polymerization to a thickness of 100 Å on the thin ferromagnetic metal film layer by use of the same apparatus as in Example 1. Electric discharge was conducted by ionizing octafluorocyclobutane gas at a flow rate of 25 cm³/minute in a vacuum of 0.35 Torr, and generating plasma thereof. The high frequency power applied was 100W. The substrate covered by the polymer film formed by plasma polymerization was wound around a wind-up roller as described in Example 1.

Corrosion resistance of the magnetic recording medium prepared as described above was evaluated in the same manner as described in Example 1. In this evaluation, it was found that the magnetic recording medium exhibits corrosion resistance markedly improved over that of a magnetic recording medium consisting of a substrate and a thin ferromagnetic metal film layer overlaid on the substrate. Further, Auger electron spectroscopy conducted on the magnetic recording medium prepared as described above revealed that the magnetic recording medium had the same distribution of carbon contents in the thickness direction as that found in Example 1.

COMPARATIVE EXAMPLE

A thin ferromagnetic metal film layer was overlaid on a substrate in the same manner as described in Example 1. A solution containing 0.5% of polyvinylbutyral in methyl ethyl ketone was applied onto the thin ferromagnetic metal film layer so that the thickness of the resulting polyvinylbutyral film would be about 100 Å, and dried.

Figure 5B:
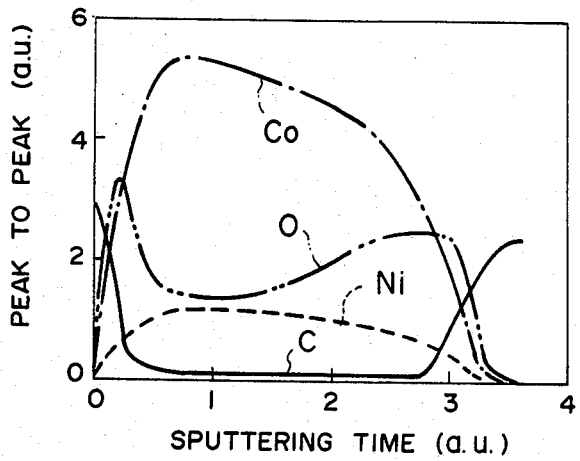
FIGS. 5B and 5C are graphs showing the distributions of the contents of constituent elements in the thickness direction of the conventional magnetic recording media, as analyzed by Auger electron spectroscopy.
Figure 5C:
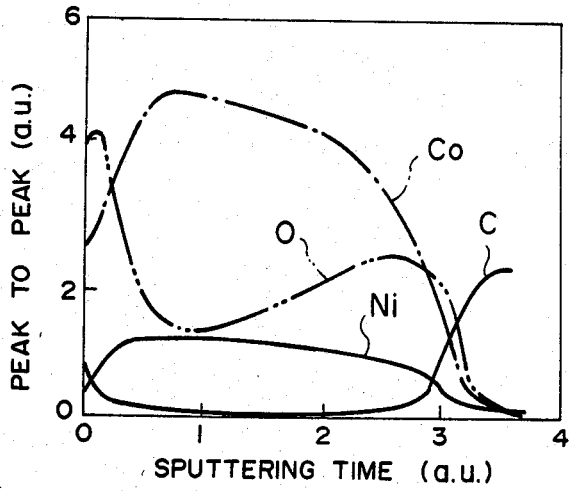

FIG. 5B shows the distribution of carbon contents in the thickness direction of the magnetic recording medium prepared for comparison as described above, as analyzed by Auger electron spectroscopy. As is clear from FIG. 5B, the carbon contents were high only at the surface of the magnetic recording medium, and decreased sharply towards the inside of the magnetic recording medium. Further, FIG. 5C shows the distribution of carbon contents in the thickness direction of a magnetic recording medium consisting of a substrate and a thin ferromagnetic metal film layer overlaid on the substrate as analyzed by Auger electron spectroscopy. From FIGS. 5B and 5C, it is found that the carbon content distribution in the film thickness direction of the magnetic recording medium prepared for comparison as described above is similar to that of the magnetic recording medium consisting of a substrate and a thin ferromagnetic metal film layer overlaid on the substrate but having no film on the thin ferromagnetic metal film layer. Thus it is presumed that, in the magnetic recording medium prepared as described in this comparative example, the polyvinylbutyral film is simply overlaid in the plane form on the thin ferromagnetic metal film layer, and is not permeated into the spaces between the columnar grains of the thin ferromagnetic metal film layer.

When corrosion resistance of the magnetic recording medium of this comparative example was examined in the same manner as described in Example 1, corrosion arose over the entire surface of the magnetic recording medium as in the case of the magnetic recording medium consisting of a substrate and a thin ferromagnetic metal film layer overlaid on the substrate but having no film on the thin ferromagnetic metal film layer.

In the present invention, the method of overlaying the polymer film by plasma polymerization on the thin ferromagnetic metal film layer is not limited to the method as described in Examples 1 and 2. For example, electric discharge may also be conducted by use of microwave power, alternating current power, or the like. Further, the organic monomer used for the formation of the polymer film by plasma polymerization may also be tetrafluoromethane, tetrafluoroethylene, hexafluoroethane, perfluoropropane, ethylene, butylene, styrene, or the like.

We claim:

1. A magnetic recording medium comprising a non-magnetic substrate, a thin ferromagnetic film layer composed of ferromagnetic columnar grains, and a polymer film formed by plasma polymerization, said polymer film being overlayed on said thin ferromagnefic film layer so as to permeate into the spaces between said ferromagnetic columnar grains, wherein said polymer film formed by plasma polymerization is prepared by polymerizing plasma of methane.

2. A magnetic recording medium as defined in claim 1 wherein said non-magnetic substrate is a flexible plastic film exhibiting surface roughness of 0.012 $\mu$m or less.

3. A magnetic recording medium as defined in claim 1 wherein said thin ferromagnetic film layer is composed of a material selected from the group consisting of cobalt, a cobalt alloy, and a cobalt alloy containing oxygen.

4. A magnetic recording medium as defined in claim 1 wherein said thin ferromagnetic film layer has an obliquely deposited columnar grain structure.

5. A magnetic recording medium as defined in claim 1 wherein said thin ferromagnetic film layer has a thickness of about 1,400 Å.

6. A magnetic recording medium as defined in claim 1 wherein said polymer film formed by plasma polymerization has a thickness within the range of 20 Å to 800 Å.

* * * * *